(12) United States Patent
Kaplan et al.

(10) Patent No.: US 6,623,851 B1
(45) Date of Patent: Sep. 23, 2003

(54) COMPOSITE FOR FINE AND GRAPHIC ART APPLICATIONS AND METHOD FOR MAKING COMPOSITE

(76) Inventors: Daniel Benjamin Kaplan, 10 Lubrano Street, East Brighton, Victoria 3194 (AU); Anthony Richard Whitham, Lot 2998 Jalan Raya Merbok, 08400 Merbok, Kedah Darul Aman (MY)

( * ) Notice: Subject to any disclaimer, the term of this patent is extended or adjusted under 35 U.S.C. 154(b) by 0 days.

(21) Appl. No.: 09/626,667

(22) Filed: Jul. 27, 2000

(51) Int. Cl.⁷ .............................................. B32B 27/00
(52) U.S. Cl. ..................... 428/341; 428/342; 428/200; 428/213; 428/220; 428/500; 428/211
(58) Field of Search .................................. 428/342, 211, 428/341, 532, 500, 200, 213, 219, 220, 42.3, 174, 195

(56) References Cited

U.S. PATENT DOCUMENTS 5,718,995 A * 2/1998 Eichorst et al. ............... 430/39
6,059,391 A * 4/2000 Fulkerson et al. ............. 347/2
6,391,440 B1 * 5/2002 Yoshino et al. ............ 428/342

* cited by examiner

Primary Examiner—Merrick Dixon
(74) Attorney, Agent, or Firm—Duane Morris LLP

(57) ABSTRACT

This invention relates to a composite for fine and graphic art applications. In an exemplary embodiment, the composite has at least three paper layers, one fiberboard layer, and a surface coating. The invention also is directed toward a method for making such a composite, including a method for making an embossed composite. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

17 Claims, 2 Drawing Sheets

COMPOSITE FOR FINE AND GRAPHIC ART APPLICATIONS AND METHOD FOR MAKING COMPOSITE

BACKGROUND OF THE INVENTION

1. Field of the Invention

This invention relates to a composite for fine and graphic art applications. The composite comprises three paper layers and one fiberboard layer, and a surface coating. The invention also is directed toward a method for making such a composite, including a method for making an embossed composite.

2. Description of the Prior Art

Prior art surfaces for graphic art applications have included canvas for paints and parchment for ink. Other prior art surfaces have included paper for water color. More recent prior art surfaces have comprised cotton and combinations of cotton and synthetic yarns.

Rigid surfaces are often desirable for graphic art applications. Prior art rigid surfaces have comprised solid boards joined together to form flat panels. These wooden graphic art surfaces were subject to cracking and deterioration.

Other prior art surfaces have comprised cardboard and the combination of cotton woven fabric laminated onto cardboard. In such prior art embodiments, the canvas is stretched over the cardboard, laminated to the cardboard, and then wrapped around the edges of the cardboard. The remaining canvas on the reverse side of the cardboard is glued to the cardboard. In some cases, a paper liner is laminated to cover the cardboard. Such prior art surfaces are subject to warping. The application of wet media to such surfaces can increase the warping.

The present invention provides a dimensionally stable graphic art surface that is more resistant to warping and deterioration than the prior art surfaces described above.

SUMMARY OF THE INVENTION

The present invention is directed toward a composite for fine and graphic art applications. This invention comprises a medium density fiberboard layer comprising cellulosic fibers, amino plastic resins, and paraffin. The fiberboard layer has a thickness in the range of 2.5 to 40 millimeters, a first surface, and a second surface opposite the first surface.

The invention further comprises a second paper layer bonded to the first surface of the fiberboard layer. The second paper layer comprises cellulosic fibers, ink, and amino plastic resins. The second paper layer has a mass to surface area ratio in the range of 100 to 200 grams per square meter.

The invention further comprises a base paper layer having a first side, and a second side opposite the first side. The first side is bonded to the second surface of the fiberboard layer. The base paper layer comprises cellulosic fibers and amino plastic resins. The base paper layer has a mass to surface area ratio in the range of 100 to 200 grams per square meter.

The invention further comprises an overlay paper layer having an outer surface and an inner surface bonded to the second side of the base paper layer. The overlay paper layer comprises cellulosic fibers and a polymeric adhesive. The overlay paper layer has a mass to surface area ratio in the range of 50 to 110 grams per square meter. The invention further comprises a surface coating on the outer surface of the overlay paper. The surface coating comprises an acrylic based formulation capable of adhering to acrylic and oil based paints. The coating has a pH in the range of 7.2 to 9.0.

Another embodiment of the present invention is directed toward a method of making a composite for fine and graphic art applications. This method consists of assembling a multi layer composite comprising a fiberboard layer, a second paper layer, a base paper layer, and overlay paper layer, and a surface coating, as described above. This method further comprises pressing the composite in a press, depressing the press at a preselected depressurization rate until the press pressure is at ambient pressure conditions, and allowing the composite to cool to a temperature below 50° C.

This method further comprises coating the edges of the composite with an emulsion paint and coating the top and side surfaces of the composite with the surface coating comprising an acrylic based formulation capable adhering to acrylic and oil based paints.

DESCRIPTION OF THE PREFERRED EMBODIMENT

A first aspect of the present invention is directed toward a composite for fine and graphic art applications. This invention comprises a medium density fiberboard layer comprising cellulosic fibers, amino plastic resins, and paraffin. In a preferred embodiment, the cellulosic fibers are lingo cellulosic fibers. In another preferred embodiment, the fiberboard layer has a density in the range of 600 to 1000 kilograms/cubic meter. The fiberboard layer 10 has a thickness in the range of 2.5 to 40 millimeters, a first surface 11, and a second surface 9 opposite the first surface, as shown in FIG. 1.

Figure 1:
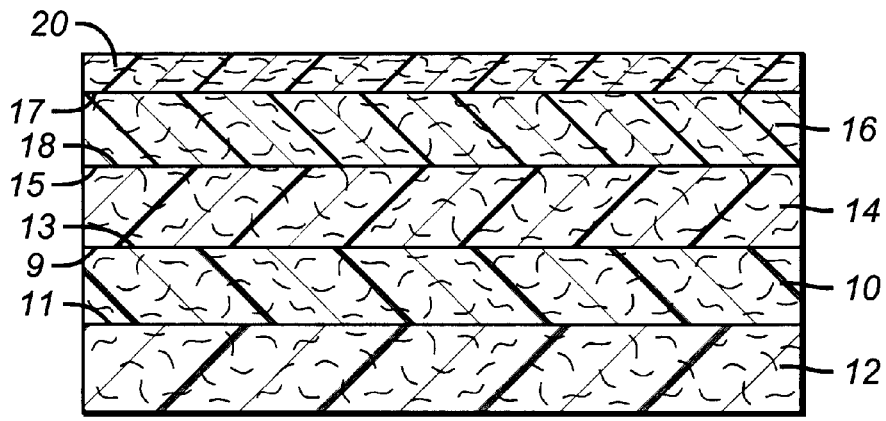
FIG. 1 is a side view of the composite of the present invention.

The invention further comprises a second paper layer 12 bonded to the first surface of the fiberboard layer, as shown in FIG. 1. The second paper layer comprises cellulosic fibers, ink, and amino plastic resins. The second paper layer has a mass to surface area ratio in the range of 100 to 200 grams per square meter. In one preferred embodiment, the second paper layer comprises plain paper. In another preferred embodiment, the second paper layer comprises printed paper. In a preferred embodiment, the second paper layer has a thickness in the range of 30 to 350 microns.

The invention further comprises a base paper layer 14 having a first side 13, and a second side 15 opposite the first side, as shown in FIG. 1. The first side is bonded to the second surface of the fiberboard layer. The base paper layer comprises cellulosic fibers and amino plastic resins. The base paper layer has a mass to surface area ratio in the range of 100 to 200 grams per square meter. In a preferred embodiment, the aminoplastic resin in the base paper comprises methylol derivatives of urea. In another preferred embodiment, the aminoplastic resins in the base paper comprise methylol derivatives of melamine. In a preferred embodiment, the base paper layer has a thickness in the range of 30 to 350 microns.

The invention further comprises an overlay paper layer 16 having an outer surface 17 and an inner surface 18 bonded to the second side of the base paper layer, as shown in FIG. 1. The overlay paper layer comprises cellulosic fibers and a polymeric adhesive. In a preferred embodiment, the polymeric adhesive comprises polyurethane. The overlay paper layer has a mass to surface area ratio of at least 50 grams per square meter. In a preferred embodiment, the overlay paper layer has a thickness in the range of 30 to 350 microns. In a preferred embodiment, the fiberboard layer, second paper layer, base paper layer, and overlay paper layer comprise shaves of more than one color.

Figure 2:
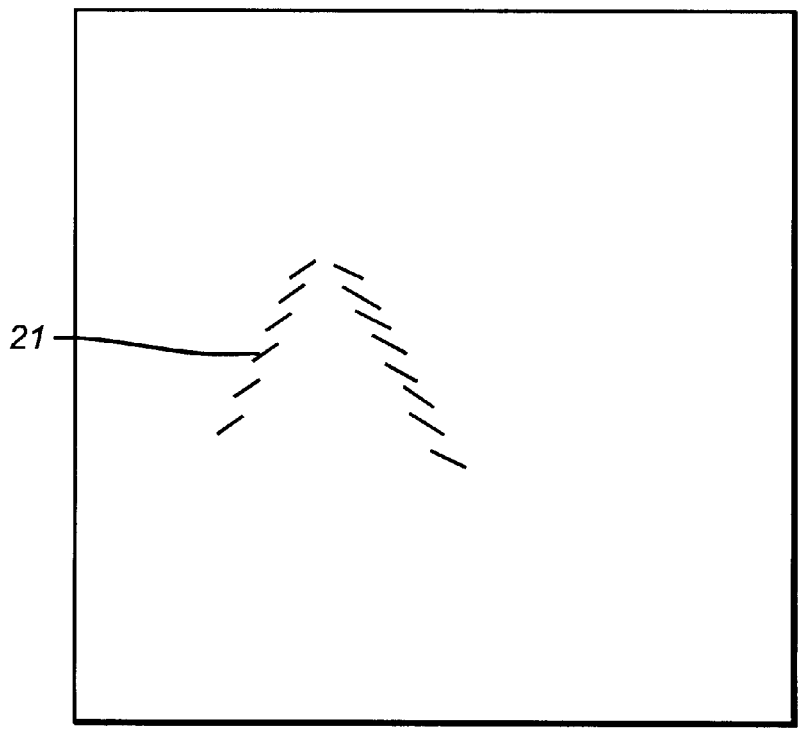
FIG. 2 is top view of a first preferred embodiment of the composite of the present invention.

The invention further comprises a surface coating 20 on the outer surface of the overlay paper, as shown in FIG. 1. The surface coating comprises an acrylic based formulation capable of adhering to acrylic and oil based paints. The coating has a pH in the range of 7.2 to 9.0. In a preferred embodiment, the coating is a water based emulsion. In a preferred embodiment the surface coating comprises titanium dioxide, acrylic resin, and calcium carbonate particles. In another preferred embodiment, a selected pattern 21 is embossed into the outer surface of the overlay paper layer or the second paper layer, as shown in FIG. 2.

The present invention is also directed toward a method of making a composite for fine and graphic art applications, comprising assembling a multi layered composite, comprising a fiberboard layer, a second paper layer, a base paper layer, an overlay paper layer and a surface coating, as described above. This step is shown in Block 30 of FIG. 3.

Figure 3:
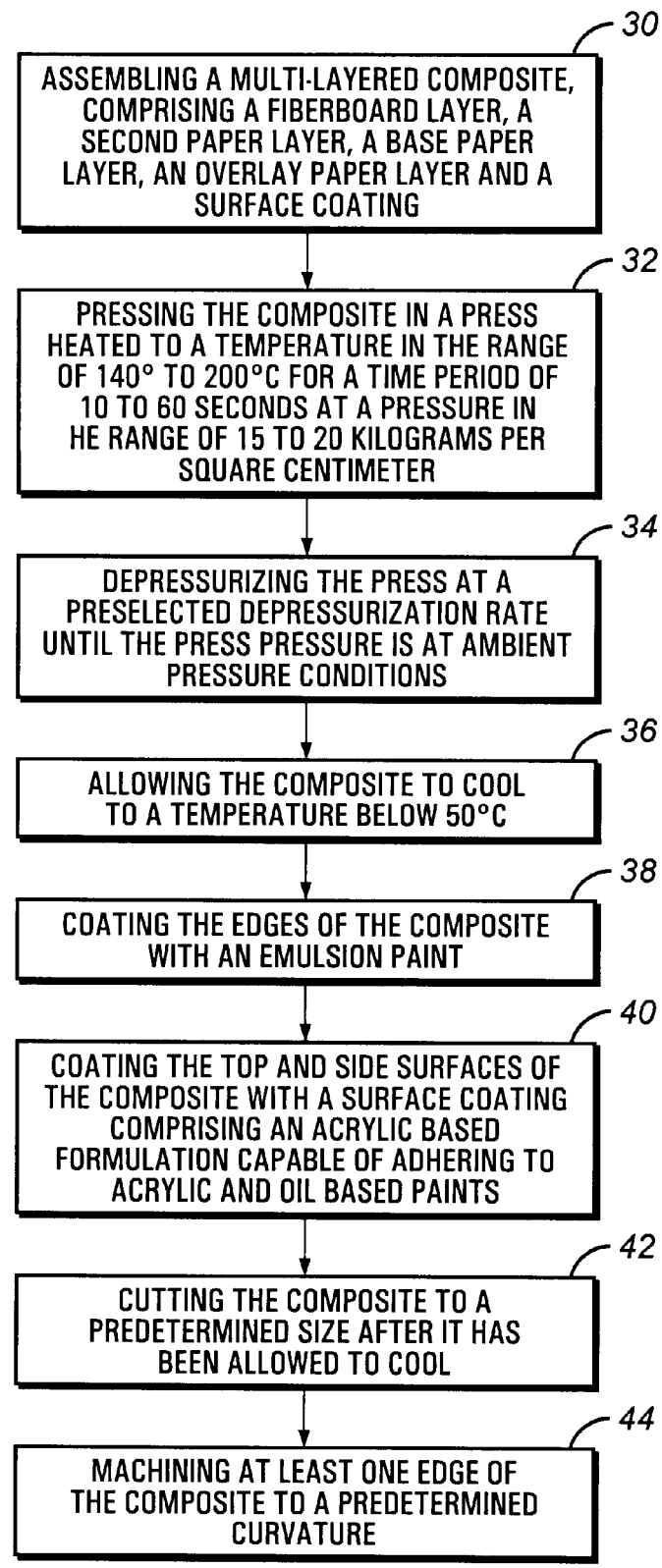
FIG. 3 is a block diagram of a method of making the composite of the present invention.

This method further comprises pressing the composite in a press heated to a temperature in the range of 140° to 200° C. for a time period of 10 to 60 seconds at a pressure in the range of 15 to 20 kilograms per square centimeter, as shown in block 32 of FIG. 3. This method further comprises depressurizing the press at a preselected depressurization rate until the press pressure is at ambient pressure conditions as shown in Block 34 of FIG. 3.

This method further comprises allowing the composite to cool to a temperature below 50° C., as shown in block 36 of FIG. 3. This method further comprises coating the edges of the composite with an emulsion paint, as shown in Block 38 of FIG. 3.

This method further comprises coating the top and side surfaces of the composite with a surface coating comprising an acrylic based formulation capable of adhering to acrylic and oil based paints. This coating has a pH in the range of 7.2 to 9.0. This step is shown in Block 40 of FIG. 3.

In a preferred embodiment, this method further comprises cutting the composite to a predetermined size after it has been allowed to cool, as shown in Block 42 of FIG. 3. In another preferred embodiment, this method further comprises machining at least one other edge of the composite to a predetermined curvature, as shown in Block 44 of FIG. 3.

In another preferred embodiment, this method comprises placing metal plates with an embossing pattern on top and on bottom of the composite in the press. This method further comprises pressing an embossed pattern into the composite surface during the time that press is pressurized. In a preferred embodiment, this method comprises embossing at least two other edges of the composite after it is allowed to cool.

The foregoing disclosure and description of the invention are illustrative and explanatory. Various changes in the size, shape and materials, as well as in the details of the illustrative embodiments may be made without departing from the spirit of the invention.

What is claimed is:

1. A composite for fine and graphic art applications comprising:
   a. medium density fiberboard layer comprising cellulosic fibers, aminoplastic resins, and paraffin, said fiberboard layer having a thickness in the range of 2.5 to 40 millimeters, a first surface, and a second surface opposite said first surface;
   b. second paper layer bonded to the first surface of said fiberboard layer, said second paper layer comprising cellulosic fibers, ink, and aminoplastic resins, said second paper layer having a mass to surface area ratio in the range of 100 to 200 grams per square meter;
   c. base paper layer having a first side and a second side opposite said first side, the first side being bonded to the second surface of said fiberboard layer, said base paper layer comprising cellulosic fibers, and aminoplastic resins, said base paper layer having a mass to surface area ratio in the range of 100 to 200 grams per square meter;
   d. overlay paper layer having an outer surface and an inner surface bonded to the second side of said base paper layer, said overlay paper layer comprising cellulosic fibers and a polymeric adhesive, said overlay paper layer having a mass to surface area ratio of at least 50 grams per square meter; and
   e. surface coating on the outer surface of said overlay paper, said surface coating comprising an acrylic based formulation capable of adhering to acrylic and oil based paints, said surface coating having a pH in the range of 7.2 to 9.0.

2. The composite of claim 1 wherein said polymeric adhesive comprises polyurethane.

3. The composite of claim 1 wherein said cellulosic fibers are lingo cellulosic fibers.

4. The composite of claim 1 wherein said fiberboard layer has a density in the range of 600 to 1000 kilograms/cubic meter.

5. The composite of claim 1 wherein said fiberboard layer, second paper layer, base paper layer, and overlay paper layer comprise shades of more than one color.

6. The composite of claim 1 wherein said aminoplastic resins in said base paper layer comprise methylol derivatives of urea.

7. The composite of claim 1 wherein said aminoplastic resins in said base paper layer comprise methylol derivatives of melamine.

8. The composite of claim 1 wherein said surface coating is a water based emulsion.

9. The composite of claim 1 wherein a selected pattern is embossed into the outer surface of said overlay paper layer or said second paper layer.

10. The composite of claim 1, wherein said second paper layer comprises plain paper.

11. The composite of claim 1, wherein said second paper layer comprises printed paper.

12. The composite of claim 1, wherein said surface coating further comprises titanium dioxide, acrylic resin and calcium carbonate particles.

13. A composite for fine and graphic art applications comprising:
   a. medium density fiberboard layer comprising cellulosic fibers, aminoplastic resins, and paraffin, said fiberboard layer having a thickness in the range of 2.5 to 40 millimeters, a first surface, and a second surface opposite said first surface;
   b. a second paper layer bonded to the first surface of said fiberboard layer, said second paper layer comprising cellulosic fibers, ink, and aminoplastic resins, said second paper layer having a mass to surface area ratio in the range of 100 to 200 grams per square meter and having a thickness in the range of 30 to 350 microns;

c. a base paper layer having a first side and a second side opposite said first side, the first side being bonded to the second surface of said fiberboard layer, said base paper layer comprising cellulosic fibers, and aminoplastic resins, said base paper layer having a mass to surface area ratio in the range of 100 to 200 grams per square meter and having a thickness in the range of 30 to 350 microns;

d. an overlay paper layer having an outer surface and an inner surface bonded to the second side of said base paper layer, said overlay paper layer comprising cellulosic fibers and a polymeric adhesive, said overlay paper layer having a mass to surface area ratio of at least 50 grams per square meter and having a thickness in the range of 30 to 350 microns; and e. a surface coating on the outer surface of said overlay paper, said surface coating comprising an acrylic based formulation capable of adhering to acrylic and oil based paints, said coating surface having a ph in the range of 7.2 to 9.0.

14. The composite of claim 13 wherein said polymeric adhesive comprises polyurethane.

15. The composite of claim 13 wherein said cellulosic fibers are lingo cellulosic fibers.

16. The composite of claim 13 wherein said aminoplastic resins in said base paper layer comprise methylol derivatives of urea.

17. The composite of claim 13 wherein said aminoplastic resins in said base paper layer comprise methylol derivatives of melamine.

\* \* \* \* \*